Nov. 5, 1957 H. W. KAUFMANN 2,812,448
DELAY FLOP
Filed Sept. 3, 1954 3 Sheets-Sheet 1
FIG. 1.
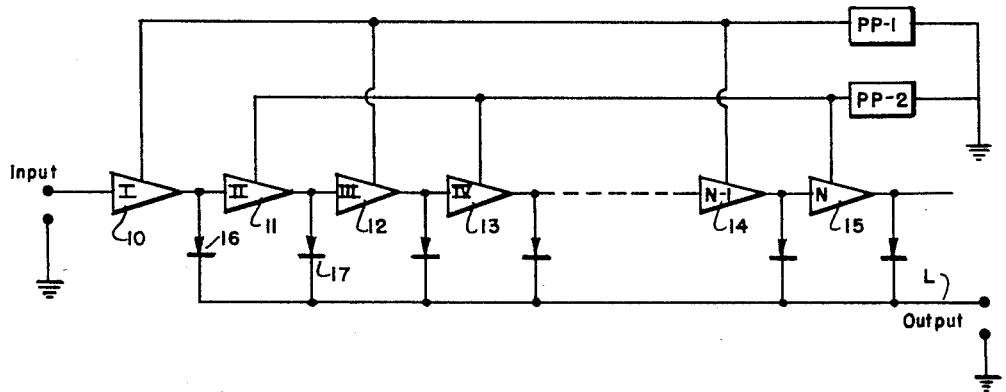
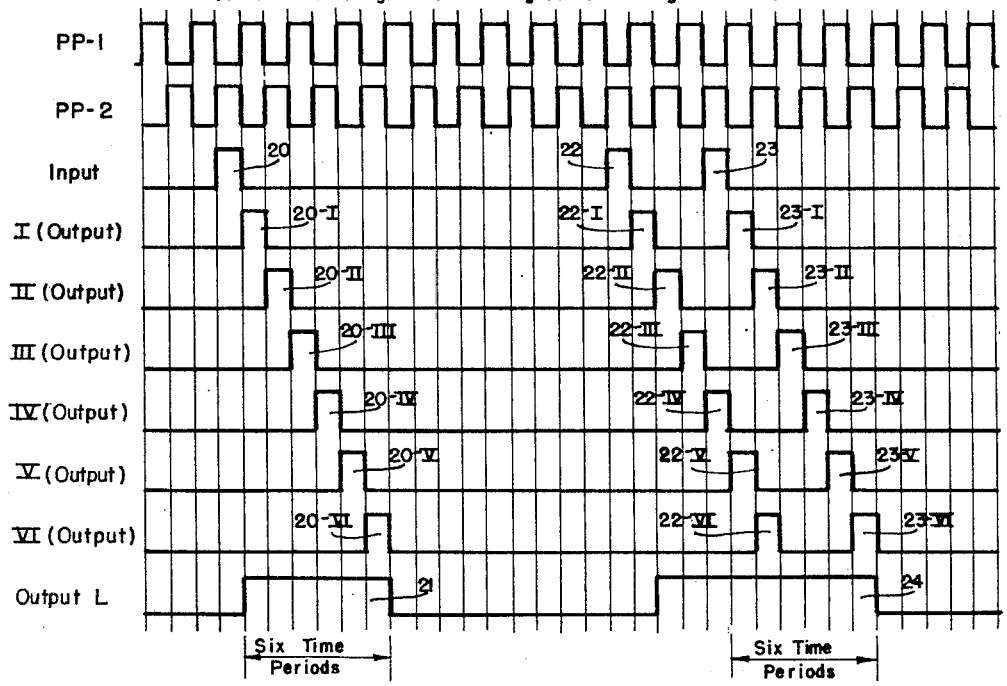
FIG. 2.
INVENTOR
HENRY WILLIAM KAUFMANN
BY
ATTORNEY

INVENTOR
HENRY WILLIAM KAUFMANN
BY
ATTORNEY

United States Patent Office 2,812,448
Patented Nov. 5, 1957

2,812,448

DELAY FLOP

Henry William Kaufmann, Phoenixville, Pa., assignor, by mesne assignments, to Sperry Rand Corporation, New York, N. Y., a corporation of Delaware Application September 3, 1954, Serial No. 453,981

19 Claims. (Cl. 307—88)

This invention relates to flops and more particularly to both resettable and non-resettable delay flops.

It is desirable in a computer circuit to employ a delay flop for purposes that are well known in the art. In the past, delay flops have employed vacuum tubes or other similar devices which have had certain disadvantages. Moreover, in connection with computing systems employing magnetic amplifiers throughout, it is desirable to have a delay flop which employs techniques which will cooperate with those used in the remainder of the system. The prior art fails to disclose such a delay flop. There is, however, the prior application of Robert D. Torrey now United States application Serial No. 453,833 filed September 2, 1954, entitled "Delay Flop." It is desirable, as taught by the present invention, to provide a delay flop in which the output will continue for any desired length of time following a given input pulse and moreover which has an output in the form of a continuous signal instead of a series of pulses. It is an object of the present invention to provide a delay flop having the characteristics mentioned in the preceding sentence.

It is a further object of the invention to provide a delay flop, or pulse forming circuit, that may be conveniently used in computer circuits employing magnetic amplifiers.

It is another object of the invention to provide a delay flop which does not use vacuum tubes or other components likely to burn out.

It is an additional object of the invention to provide a delay flop that is low in cost and yet effective.

Still another object of the invention is to provide a delay flop of small physical size as compared with the delay flops of the prior art.

Another object of the invention is to provide a delay flop that is more reliable in operation than the prior art types.

In addition, it is an object of the invention to provide a delay flop which has the same advantages over prior art delay flops as magnetic amplifiers have over vacuum tube amplifiers.

In carrying out the foregoing objects, I provide a number of non-complementing magnetic amplifiers connected in cascade. The outputs of these several amplifiers are connected together and the input signal is fed to the input of the first of the amplifiers. Following each input signal there will be a series of output signals, one for each amplifier which is connected in cascade, and these output signals will occur one after the other so as to form a continuous output signal. The length of the output signal is controlled by the number of amplifiers connected in cascade. For example, if six are included in the cascade arrangement, following each input pulse there will be a total of six output pulses merged together to form a single continuous pulse equal to the width of six pulses. If one or more additional input pulses appear before the conclusion of the sixth output pulse, the apparatus will continue to produce its continuous output signal for six time periods following the last input signal. It is therefore a resettable delay flop. In an alternate form of the invention, two magnetic amplifiers are connected to form a modified mutual-inhibition series type flip-flop circuit interconnected by condenser-resistor combination. In response to a given input signal, the flip-flop circuit will continue to generate output signals until the condenser is charged, at which time the output will cease. This form of the invention is a non-resettable delay flop, since if a second input signal is received, prior to the termination of the output signal, it will be wholly ineffective.

In the drawings:

Figure 1 is a block diagram of the preferred form of this invention.

Figure 2 is a waveform diagram of the device shown in Figure 1 assuming a six-stage device.

Figure 3:
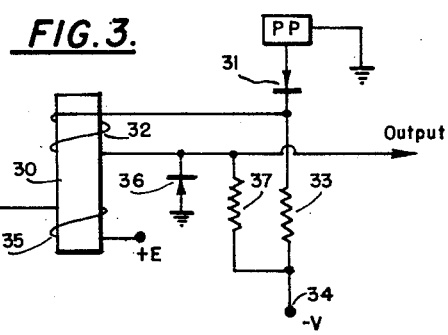
Figure 3 is a schematic diagram of a non-complementing amplifier of the type that may be used in connection with this invention.

The device of Figure 1 employs two pulse generators PP–1 and PP–2. These pulse generators produce spaced pulses, and the pulses produced by each of the generators appear during the spaces between the pulses of the other generator, all as shown in Figure 2. The amplifiers 10, 11, 12, 13, 14 and 15 are non complementing magnetic amplifiers. That is to say, the amplifier will allow a power pulse from its associated pulse generator to flow through it to its output only in event it received a control pulse at its input during the time period immediately preceding the receipt of the power pulse. For example, non-complementing magnetic amplifier 10 receives pulses from source PP–1. If, during the spaces between the pulses from source PP–1, the amplifier 10 does not receive an input signal, there will be no output. On the other hand, if an input signal arrives at amplifier 10 during spaces between two power pulses from source PP–1, the amplifier 10 will allow the pulse from source PP–1 which follows the input signal to flow to the output of the magnetic amplifier, which in this case is rectifier 16. That output pulse will also constitute an input pulse for amplifier 11. Since the pulses from each of sources PP–1 and PP–2 appear during the spaces between the pulses of the other source, the output pulse from source 10 will appear during the spaces between the power pulses PP–2 fed to amplifier 11. Hence, any output pulse from amplifier 10 will cause amplifier 11 to allow the next pulse from source PP–2 to flow through amplifier 11 to rectifier 17 and also to the input of amplifier 12. This situation is disclosed in more detail in connection with Figure 2. In Figure 2 assume that an input signal 20 is applied to the input of amplifier 10 during the spaces between two power pulses of source PP–1. Amplifier 10 (also designated by Roman numeral I) then produces an output pulse 20–I which will actuate the input of amplifier 11 and cause it to produce an output 20–II. The latter pulse will actuate the input of amplifier 12 and cause it to produce an output 20–III. The latter pulse will actuate the input of amplifier 13 and cause it to produce an output 20–IV. That output pulse will actuate the input of amplifier 14 and cause it to produce an output 20-V, which in turn will actuate the input of amplifier 15 and cause the latter to produce an output pulse 20-VI. The outputs of all the magnetic amplifiers are connected through rectifiers 16, 17, etc. to a common output load circuit L. Consequently, the output signals of amplifiers 10 to 15 inclusive are all added together, which means that the outputs 20-I, 20-II, 20-III, 20-IV, 20-V and 20-VI are all added together and form an output pulse 21 which is six time periods in length. Consequently, following the input signal 20 there was an output at L involving a signal 21 of six time periods in length. It is noted that the output is six time periods in length because six amplifiers, 10 to 15 inclusive, were employed. However, it is possible to use any number of amplifiers as shown by the letter N of Figure 1, and in event fifteen amplifiers are used, for example, the output signal would be fifteen time periods long. Moreover, the device has unusual reliability and accuracy, as it does not depend on the charging of a condenser, or the collapsing of a field in an inductor, or the building up of the magnetizing force in a transformer core, etc. All of these expedients have the disadvantage in that there are practical operating limits beyond which they cannot operate, and moreover, there is, in some cases, the possibility that some residual charge in the condenser or some residual magnetism in a transformer core, etc. may cause other devices to be inaccurate and unreliable at times. With the present device there is little possibility that it will not function exactly as contemplated and expected.

In order to illustrate the resetting of the device, assume that a pulse 22 arrives at the input of amplifier 10 and that prior to the end of six time periods thereafter another input pulse 23 arrives at the input. Since the device is resettable there will be a series of six output pulses at the output L following the last input pulse. It will now be shown why this occurs. The input pulse 22 will cause a series of output pulses 22-I to 22-VI, the same as input pulse 20 caused a series of six output pulses 20-I to 20-VI. In addition, the pulse 23 when it arrives will cause a series of six output pulses 23-I to 23-VI to occur. The output pulse 24 will include all of the pulses 22-I to 22-VI as well as 23-I to 23-VI and therefore will be an output pulse which extends for six time periods following the pulse 23.

Suitable magnetic amplifiers for use in Figure 1 are fully described and claimed in the two applications, Theodore H. Bonn and Robert D. Torrey, Serial No. 408,858, filed January 8, 1954, entitled "Signal Translating Device"; John Presper Eckert, Jr. and Theodore H. Bonn, Serial No. 382,180, filed September 24, 1953, entitled "Signal Translating Device." These applications are assigned to the same assignee as the present case.

Figure 4:
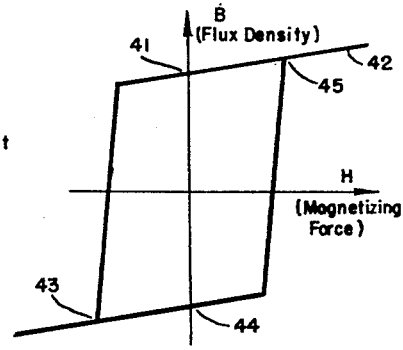
Figure 4 is a hysteresis loop for the core material employed in connection with Figure 3.

Figure 3 is a schematic diagram of a non-complementing series amplifier of the type that may be used in connection with the device shown in Figure 1. The magnetic core 30 may be made of a variety of materials, among which are the various types of ferrites and the various magnetic tapes, including Orthonik and 4-79 Moly-Permalloy. These materials may have different heat treatments to give them different properties. The magnetic material employed in the core should preferably, though not necessarily, have a substantially rectangular hysteresis loop (as shown in Figure 4). Cores of this character are now well known in the art. In addition to the wide variety of materials available, the core may be constructed in a number of geometries including both closed and open paths; for example, cup-shaped, strips, and toroidal-shaped cores are possible. Those skilled in the art understand that when the core is operating on the horizontal (or substantially saturated) portions of the hysteresis loop, the core is generally similar in operation to an air core in that the coil on the core is of low impedance. On the other hand, when the core is operating on the vertical (or unsaturated) portions of the hysteresis loop, the impedance of the coils on the core will be high.

In Figure 3, the power pulses from source PP are positive as in the previous case and pass through rectifier 31, coil 32, resistor 37, to negative pole 34 which is below ground potential. If we assume that at the start of the first pulse the core was at point 44 on its hysteresis loop (see Figure 4), it will be driven to point 45. At the end of this pulse, it will return to point 41 where the magnetizing force is zero. At the conclusion of the first pulse, current will flow in the following circuit: from ground to rectifier 36, coil 32, resistor 33 to negative pole 34. This is a current flow through coil 32 in the opposite direction from that of the first pulse and drives the core negatively from point 41 to point 43 on the hysteresis loop of Figure 4. At the conclusion of this reverse pulse, the core will move to point 44 of zero magnetizing force. The second power pulse will again drive the core positively from point 44 to point 45, and from thence it will go to 41, after the conclusion of the second pulse. The next action will be another flow of current in the following circuit: from ground, rectifier 36, coil 32, resistor 33, to negative pole 34. This will revert the core to point 43. Hence, the magnetization of the core will repeatedly traverse the hysteresis loop and the majority of the time the core will be operating on unsaturated portions of the hysteresis loop, consequently there will be substantially no output. If, however, an input signal is received in coil 35, at a time when the core is at point 41, the reverse current (in circuit: ground 36—32—33—34) will not drive the core negatively to point 43 as usual. In such situation, there will be two opposite magnetizing forces on the core. On the one hand there will be a flow of current in the circuit: ground to rectifier 36, coil 32, resistor 33, to negative pole 34, tending to apply a negative magnetizing force to the core. There will be an additional input current in coil 35 tending to apply a positive magnetizing force to the core. These two magnetizing forces will cancel each other and the core will remain at point 41 on the hysteresis loop. Consequently, the next power pulse will pass through rectifier 31 and coil 32 to the output. It will drive the core from point 41 to point 42 on the hysteresis loop. The core is substantially saturated throughout this entire period, and therefore a large pulse output will appear. The operation of the non-complementing amplifier may be summarized by stating that there will be currents in coil 32 that will drive the core around the hysteresis loop without substantial saturation and therefore without any substantial pulse output until there is a pulse of current through coil 35. This latter pulse will stop the alternating magnetizations of the core, allowing the next power pulse to saturate the core and give a large output.

Figure 5:
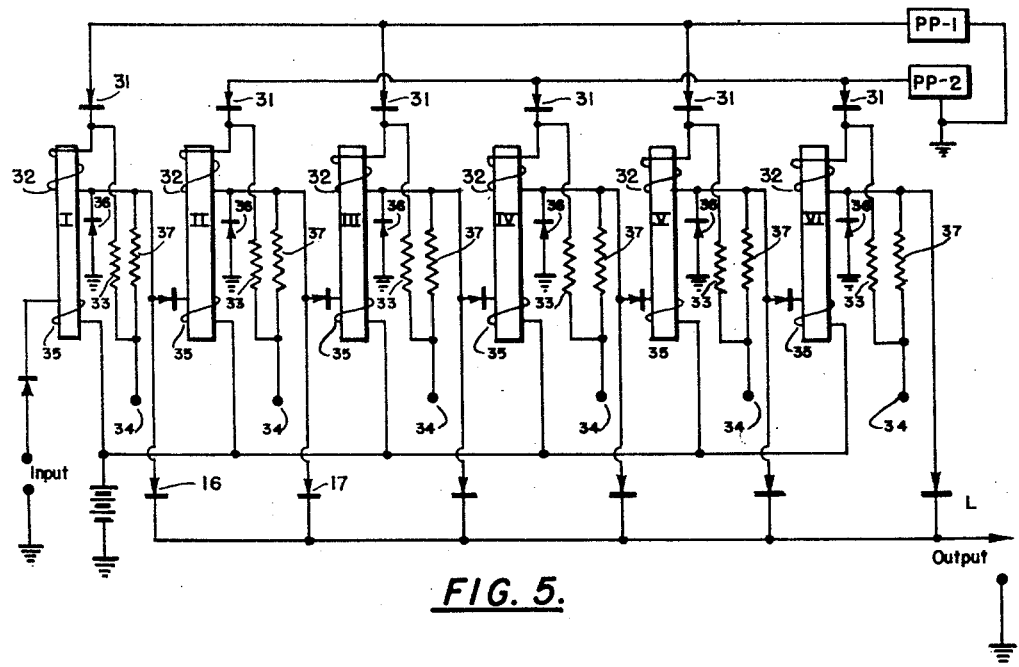
Figure 5 is a schematic diagram of the device shown in Figure 1.

Figure 5 is a schematic diagram of the block diagram of Figure 1 in which there is shown reference numbers on each one of the magnetic amplifiers corresponding to the reference numbers employed in connection with Figure 3. No further description of Figure 5 is deemed necessary, but it might be mentioned that in response to the input pulse 20 of Figure 2 being applied to magnetic amplifier I, the latter magnetic amplifier will operate exactly as described in connection with Figure 3 and produce an output pulse 20-I which will be fed into amplifier II. The input pulse 20-I being fed to amplifier II, will produce an output from that amplifier exactly as described in connection with Figure 3, the latter output being a pulse 20-II. Likewise the output of each of the magnetic amplifiers will act as an input to the next one and cause the next one to function precisely as described in connection with Figure 3. Consequently, it is clear that the device shown in Figure 5 will operate in a manner described in connection with the block diagram of Figure 1.

Figure 6:
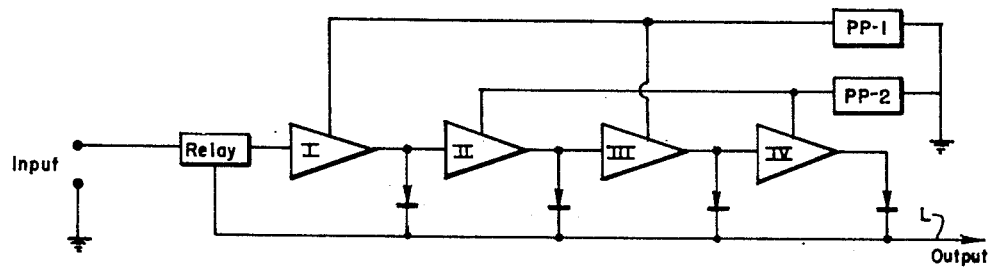
Figure 6 is a block diagram of a modified form of the invention.

Figure 6 illustrates a four-stage device of the character shown in Figure 1 with a relay in the input. The relay is triggered by the output circuit L so that as long as there is an output, the input circuit is opened. This prevents the device from having the reset feature described in connection with Figure 1. Consequently, if the six-stage device is built in accordance with Figure 6 and two pulses 22 and 23 (see Figure 2) were applied thereto, the second pulse 23 would be ineffective because the relay would open the circuit to the input during the continuance of the output pulse due to pulse 22. Consequently, the only output pulse would be a continuous pulse for six time spaces following input pulse 22. The relay of Figure 6 may be of any suitable type including a magnetic amplifier, a mechanical relay, a vacuum tube relay, etc.

Figure 7:
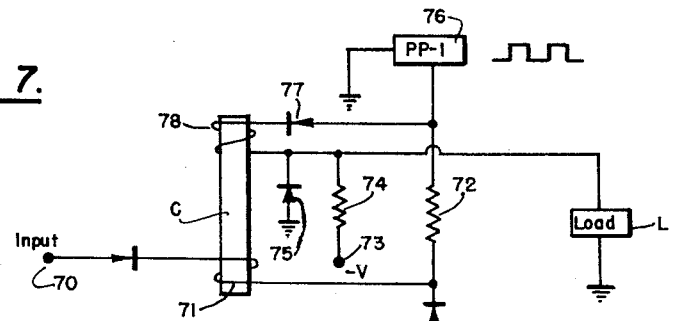
Figure 7 is a schematic diagram of a complementing magnetic amplifier of the type suitable for use in connection with the modified form of the invention.
Figure 8:
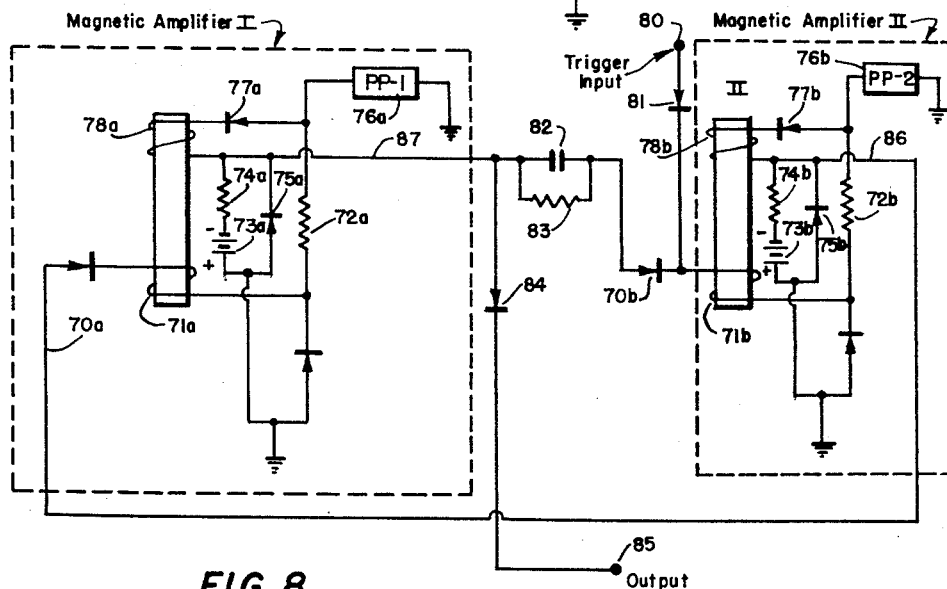
Figure 8 is a schematic diagram of a modified form of the invention.

Figure 7 is a schematic diagram of a complementing magnetic amplifier of the type employed in connection with Figure 8. The source 76, of power pulses PP–1, generates a train of equally spaced square wave pulses. If it be assumed that at the beginning of any given pulse the core has residual magnetism and flux density as represented by point 41 of the hysteresis loop of Figure 4, the power pulse will drive the core from point 41 to saturation point 42. At the conclusion of the pulse the magnetization will return to point 41. Successive pulses from power source 76 will flow through rectifier 77, coil 78 and load L, repeatedly driving the core from remanence point 41 to saturation point 42. During the interval in which the core is being driven from 41 to 42, the core is operating on a relatively saturated portion of the hysteresis loop, whereby the impedance of coil 78 is low. Hence the power pulses will flow from source 76 to load L without substantial impedance. If, however, during the interval between two power pulses, a pulse is received at the input 70, it will pass through coil 71, resistor 72, source 76, to ground. This will magnetize the core negatively driving it from point 41 to point 43. At the conclusion of this negative pulse the core will return to remanence point 44. The next power pulse from source 76 is just sufficient to drive the core from point 44 to point 45. Since this is a relatively unsaturated portion of the hysteresis loop, the coil 78 will have high impedance during this pulse and the current flow will be very low. At the conclusion of that pulse the magnetization will return to zero value 41. If no signal appears on the input immediately following the last-named power pulse, the next power pulse will drive the core to saturation at point 42 and will give a large output at the load L.

Consequently, it is clear that the magnetic amplifier of Figure 7 will feed large pulses to the load in response to each pulse from source 76, except that immediately after the receipt of any pulse on the input 70 the next power pulse will be blocked.

In order to avoid appearance at the load L of the small current which flows during the period that a power pulse is driving the core from point 44 to point 45, the parts 73, 74 and 75 may be employed. The negative source 73 passes a current greater than the said "small current" through resistor 74 and rectifier 75. This cancels the aforesaid "small current," better known as the "sneak" currents, therefore the output lead remains substantially at ground potential.

The modified form of the invention of Figure 8 is a non-resettable type of delay flop in which two magnetic amplifiers I and II, of the type shown in Figure 7 are employed. The two magnetic amplifiers I and II are fed by two sources of power pulses 76a and 76b (which are also designated as PP–1 and PP–2), whose output signals are related to each other the same as is shown in Figure 2. That is, each of these two generators produces a series of spaced power pulses in which the pulses appear during the spaces between the pulses of the other generator.

Magnetic amplifier I of Figure 8 is identical with the magnetic amplifier of Figure 7 and bears like reference numbers with the exception that the reference numbers of Figure 8 bear the subscript *a*. Likewise, the magnetic amplifier II is identical with that of Figure 7 and bears like reference numbers with the exception that the reference numbers of the parts of magnetic amplifier II bear the subscript *b*.

At the start of the apparatus, magnetic amplifier II is producing a train of output pulses on output lead 86 corresponding to the power pulses from generator 76b. It feeds these power pulses to input 70a of magnetic amplifier I. Since magnetic amplifier I does not produce output pulses as long as it is receiving input pulses, it has no output at 87 and consequently the whole apparatus has no output at 85. However, if and when a trigger input pulse is received at input 80, it flows through rectifier 81, coil 71b, resistor 72b, source 76b, to ground. This resets the core during the spaces between two power pulses from source PP–2 and consequently there is no power pulse on output 86 during the time period immediately following the trigger input signal. Since the output at wire 86 is interrupted, the next power pulse from output PP–1 will appear at the output 87. It will flow through rectifier 84 to output 85 and also through the condenser 82 to the input 70b of magnetic amplifier II. This flow of current to the input 70b of amplifier II will occur during the spaces between two power pulses of source PP–2 and will therefore reset the core and prevent the next pulse from source PP–2 from passing to the output 86. Consequently, there will be no current flow in input coil 71a and magnetic amplifier I will allow another power pulse from source 76a to flow to the output 87. This second pulse will likewise flow to the output 85 and also through the condenser 82 to the input 70b of the magnetic amplifier II. This mode of operation will continue until condenser 82 is so completely charged that insufficient current will be supplied to the input 70b to reset the core of magnetic amplifier II, in which event it will again produce pulses at its output 86. These pulses will prevent pulses from occurring at the output of magnetic amplifier I and consequently will prevent additional pulses from appearing at output 85. Since it requires a predetermined number N of pulses flowing through condenser 82 to charge the same to the extent necessary to prevent flow of pulses from wire 87 to wire 70b, the apparatus will produce at its output 85 a total of N+1 output pulses in response to a given input pulse. Moreover, it is clear that the circuit is non-resettable, for the following reasons. If an additional input pulse, at input 80, occurs while pulses are appearing at output 87 and are flowing through condenser 82 to the input 70b, the second input signal will merely add amplitude to pulses already flowing through coil 71b and will have no effect on the operation of the device. As soon as condenser 82 has been fully charged and the succession of output pulses duly stopped, there will be no further charging pulses, and the condenser 82 will discharge through resistor 83. When the condenser 82 has completely discharged through resistor 83 the device will then be receptive to another triggering input pulse at 80. Consequently the device is not only non-resettable, but will not respond to an additional input pulse for a predeterminde time following the cessation of output pulses.

I claim to have invented:

1. A pulse forming circuit comprising an input circuit, an output circuit, a plurality of magnetic amplifiers each having inputs and outputs, the input of one of the amplifiers being fed by said input circuit and the output of said one amplifier feeding the input of another one, and means interconnecting the said amplifiers and said output circuit so that in response to a single predetermined change in condition at said input circuit there will be a predetermined number of output pulses in the output circuit over a limited predetermined time.

2. A pulse forming circuit comprising an input circuit, an output circuit, a plurality of magnetic amplifiers each having inputs and outputs, the input of one of the amplifiers being fed by said input circuit and the output of said one amplifier feeding the input of another one, and means interconnecting the said amplifiers and said output circuit so that in response to a single predetermined change in condition at said input circuit there will be a predetermined number of output pulses in the output circuit over a limited predetermined time, said plurality of magnetic amplifiers being connected in cascade to operate in a series with said input circuit feeding the input of the first amplifier, the output of each amplifier feeding the input of the next one, and the last-named means combining the outputs of a plurality of said amplifiers and feeding the combined output to said output circuit.

3. A pulse forming circuit as defined in claim 1 in which the last-named means includes all of the following: a condenser constituting a feedback path from the output of the said second-named amplifier to the input of the first-named one, whereby the first and second amplifiers alternately actuate each other to effect a recycling which continues until the condenser is charged whereupon the feedback is interrupted and the recycling is stopped.

4. A delay flop comprising first and second magnetic amplifiers each having a control input, first and second generators of spaced power pulses each of which emits its pulses during the spaces between the pulses of the other generator, said generators respectively feeding the first and second magnetic amplifiers, an input circuit feeding the control input of the first magnetic amplifier, means connecting the output of the first magnetic amplifier to the control input of the second magnetic amplifier, an output circuit; and means connected to said amplifiers and to said output circuit whereby in response to a single change of conditions on said input circuit a predetermined plurality of said pulses will appear at the output circuit.

5. A delay flop as defined in claim 4 in which the magnetic amplifiers are of the non-complementing type and in which the output of each amplifier is connected to the output circuit through a rectifier.

6. A delay flop as defined in claim 4 in which the magnetic amplifiers are of the complementing type, the last-named means including a condenser connecting the output of the second to the input of the first amplifier to cause a recycling of the amplifiers to continue until the condenser becomes charged at which time the output in the output circuit will be modified from the abnormal to the normal state.

7. A delay flop comprising at least four non-complementing magnetic amplifiers each having a control input and an output; an input circuit connected to the input of the first magnetic amplifier; said amplifiers being connected in cascade with the output of the first one connected to the input of the second one, the output of the second one being connected to the input of the third one, and the output of the third one being connected to the input of the fourth one, first and second generators each generating spaced power pulses with the pulses of each source occurring during the spaces between pulses of the other source; means connected to the first generator to supply power pulses therefrom to the first and third magnetic amplifiers; means connected to the second generator to supply power pulses therefrom to the second and fourth magnetic amplifiers; an output lead; each of said magnetic amplifiers including means for allowing a power pulse fed thereto to flow to the output of that amplifier in event an input signal was received by that amplifier during the space prior to the power pulse.

8. A delay flop comprising an input circuit, magnetic amplifier means which in response to a signal on said input circuit produces an output pulse that begins immediately following the end of the input signal, second magnetic amplifier means which in response to a signal in the output of the first magnetic amplifier means produces an output pulse that begins immediately following the end of the output pulse from the first magnetic amplifier, an output lead, a first rectifier connecting the output of the first magnetic amplifier to said output lead, and a second rectifier connecting the output of the second magnetic amplifier to said output lead.

9. A delay flop comprising a first generator of spaced power pulses, a second generator producing spaced power pulses that appear during the gaps between the power pulses of the first generator, an input circuit, a first magnetic amplifier having an output and which in response to a signal on said input circuit allows the next pulse from the first generator to flow to the output of the first magnetic amplifier, a second magnetic amplifier having an output and which in response to an output signal from the first magnetic amplifier allows the next pulse from the second generator to flow to the output of the second magnetic amplifier, and means combining together the outputs of the first and second magnetic amplifiers to form one continuous pulse.

10. A resettable delay flop comprising a first generator of spaced power pulses; a second generator of spaced power pulses that appear during the gaps between power pulses of the first generator; at least four magnetic amplifiers of the type having control inputs and outputs, which also have power pulse inputs, and which allow pulses fed to the power pulse input to flow to the output if immediately prior to the receipt of such pulse a pulse was received at the control input; means connecting output of the first generator to the power pulse inputs of the first and third magnetic amplifiers; means connecting the output of the second generator to the power pulse inputs of the second and fourth magnetic amplifiers; said delay flop having an input circuit for feeding the input of the first magnetic amplifier; said magnetic amplifiers being connected in cascade with the output of each one connected to the input of the next one; a common output for all the magnetic amplifiers including means for combining all of the outputs of the individual amplifiers and merging them together to form one continuous output pulse which exists for a predetermined time period following the last signal received at said input circuit.

11. A delay flop comprising an output, first and second generators of spaced power pulses with the pulses of each source occurring during the gaps between pulses of the other source, first magnetic amplifier means for controlling the output of the first generator, second magnetic amplifier means for controlling the output of the second generator, an input circuit for controlling the first magnetic amplifier, and means connecting the magnetic amplifier means together and to said first-named output to change the state of the latter for the period of a plurality of said pulses following receipt of a given single pulse at the input circuit.

12. A delay flop comprising first and second pulse generators each of which produces spaced pulses that occur during the gaps between pulses of the other generator; first and second complementing magnetic amplifiers respectively fed with pulses from said two generators and which have outputs to which the pulses normally flow, the magnetic amplifiers each having a control input and including means to interrupt the flow of any pulse to the output if such pulse was preceded by a control pulse at the input of that magnetic amplifier; the delay flop having an input circuit feeding the input of the first magnetic amplifier; feedback means connecting the output of the first magnetic amplifier to the input of the second and the output of the second to the input of the first whereby to effect a series of output pulses from the second amplifier following receipt of an input signal at the first amplifier; said feedback means including an element which after said series of output pulses has persisted for a predetermined time period effectively interrupts the feedback means whereby the first amplifier thereupon begins to emit pulses and the second amplifier no longer emits pulses; and output means energized by the output from the one of said magnetic amplifiers.

13. A delay flop comprising first and second pulse generators each of which produces spaced pulses that occur during the gaps between pulses of the other generator; first and second complementing magnetic amplifiers respectively fed with pulses from said two generators and which have outputs to which the pulses normally flow, the magnetic amplifiers each having a control input and including means to interrupt the flow of any pulse to the output if such pulse was preceded by a control pulse at the input of that magnetic amplifier; the delay flop having an input circuit feeding the input of the first magnetic amplifier; feedback means connecting the output of the first magnetic amplifier to the input of the second and the output of the second to the input of the first; said feedback means including means which interrupts the flow of pulses from the output of the second to the input of the first magnetic amplifier after a predetermined number of pulses has passed that path; and output means energized by the output of the second magnetic amplifier.

14. A delay flop as defined in claim 13 in which the last-named means is a condenser connecting the output of the second to the input of the first magnetic amplifier.

15. A delay flop as defined in claim 14 having a resistor shunted across the condenser to discharge it.

16. A delay flop as defined in claim 8 including means to render the delay flop non-resettable connected to the output lead for preventing receipt of input signals as long as there is an output signal.

17. A delay flop as defined in claim 8 including means to render the delay flop non-resettable comprising a relay controlled by the potential of the output lead and controlling the input circuit.

18. A pulse forming circuit comprising an input circuit, an output circuit, a plurality of saturable magnetic elements, winding means linked to said elements, said winding means including first and second windings, inputs and outputs respectively connected to said first and second windings, means connecting said input circuit to said input of said first winding of a first one of said elements to supply energizing pulses thereto so as to tend to saturate said elements in a certain magnetic direction, means for regularly energizing said winding means so as to tend to saturate said elements in a certain magnetic direction and to produce pulses at each output in accordance with signals supplied to the associated input, unidirectional means coupling said output of said second winding of each one of said elements to said input of said first winding of a different one of said elements to transfer pulses in a series operation, and means coupling said outputs of said second windings of said elements to said output circuit so that in response to a single energizing pulse supplied by said input circuit to said first element input a predetermined number of output pulses are supplied to said output circuit over a predetermined number of regular energizations of said winding means.

19. A pulse forming circuit comprising an input circuit, an output circuit, a plurality of magnetic elements, input and power windings linked to said elements, inputs and outputs respectively connected to said input and power windings, means connecting said input circuit to said input of said input winding of a first one of said elements to supply energizing pulses thereto so as to tend to drive said elements in a certain magnetic direction, means for regularly energizing said power windings so as to tend to drive said elements in a certain magnetic direction and to produce pulses at each output in accordance with pulses at the associated input, unidirectional means coupling said output of said output winding of each one of said elements to said input of said input winding of a different one of said elements to transfer pulses in a series operation, and means coupling said outputs of said output windings of said elements to said output circuit so that in response to a single energizing pulse supplied by said input circuit to said first element input winding a predetermined number of output pulses are supplied to said output circuit over a predetermined number of regular energizations of said power windings.

References Cited in the file of this patent

Publication, the Computation Laboratory, Harvard University, Progress Report #2. Covering Period August 10, 1948–November 10, 1948, pp. (IV–6)–(IV–7).